United States Patent [19]
Yorksie et al.

[11] 3,852,732
[45] Dec. 3, 1974

[54] SOLID STATE UNIVERSAL BATTERY MONITOR

[75] Inventors: Daniel S. Yorksie, Pittsburgh, Pa.; Brant Terzic, Chicago, Ill.

[73] Assignee: Westinghouse Electric Corporation, Pittsburgh, Pa.

[22] Filed: June 14, 1973

[21] Appl. No.: 370,079

Related U.S. Application Data

[63] Continuation-in-part of Ser. No. 346,532, March 30, 1973, abandoned.

[52] U.S. Cl. .................................. 340/249, 320/48
[51] Int. Cl. ............................................ G08b 21/00
[58] Field of Search ........... 340/249, 309.4; 320/48; 317/31

[56] References Cited
UNITED STATES PATENTS

| | | | |
|---|---|---|---|
| 3,568,175 | 3/1971 | Schwehr | 340/249 |
| 3,688,293 | 8/1972 | Sullivan | 340/309.4 X |

Primary Examiner—John W. Caldwell
Assistant Examiner—Daniel Myer
Attorney, Agent, or Firm—J. B. Hinson

[57] ABSTRACT

A monitor for disabling a function of a battery-powered vehicle when the battery reaches a predetermined discharge state. The discharge state of the battery is determined by continuously monitoring the terminal voltage of the battery. Two warning signals are generated with each warning signal indicating progressively lower discharge states of the battery. After the second warning signal has been on for a predetermined time period some operative function of the battery-powered apparatus is disabled. If the battery-powered apparatus is a fork-lift truck for example, the lift mechanism might be disabled, however, the main drive motor could remain operative so that the truck can be returned to the battery charging station. The monitor also prohibits the disabled function from being reenergized except when a charged battery is installed in the vehicle.

8 Claims, 4 Drawing Figures

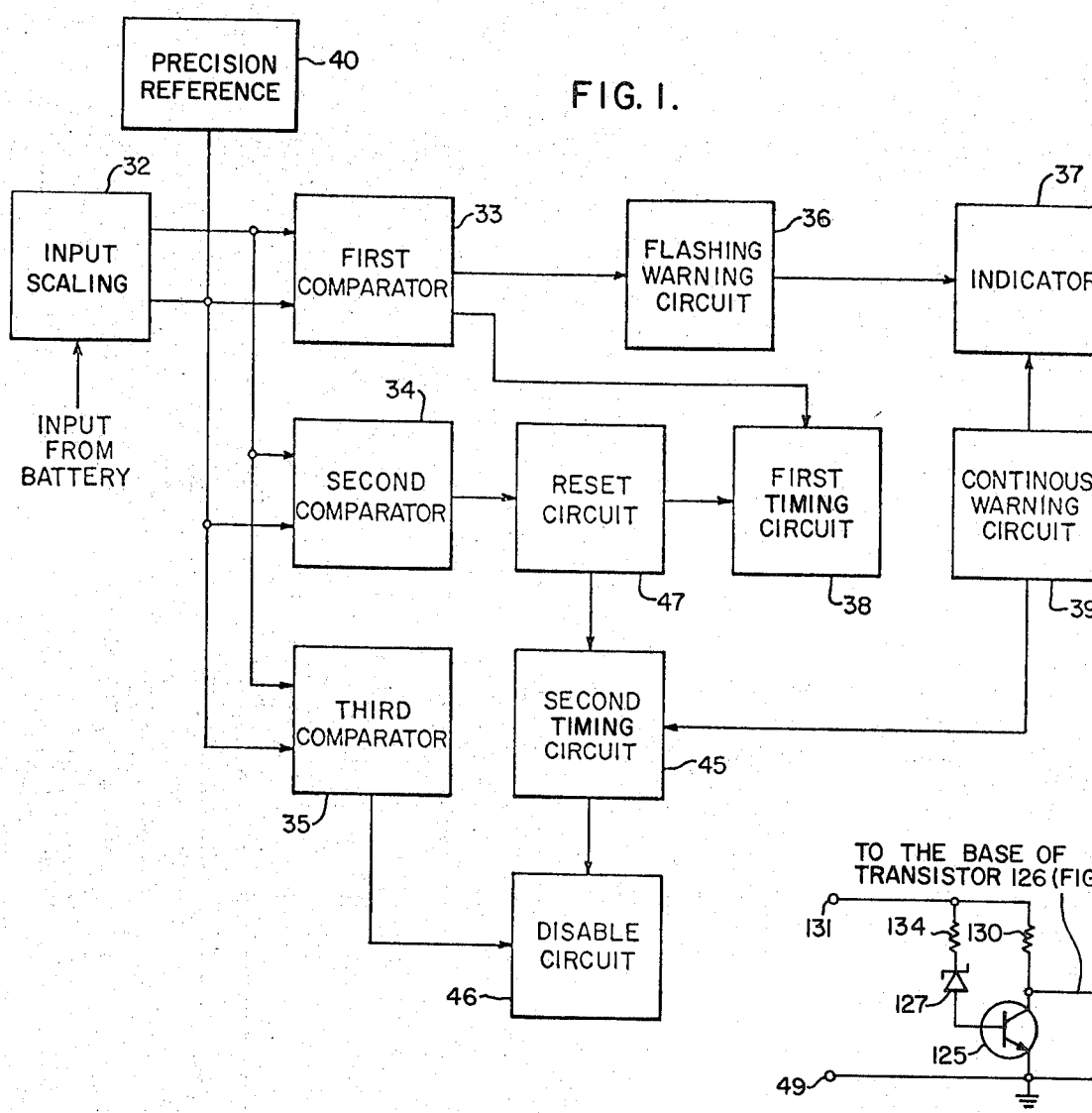
FIG. 1.
FIG. 3.
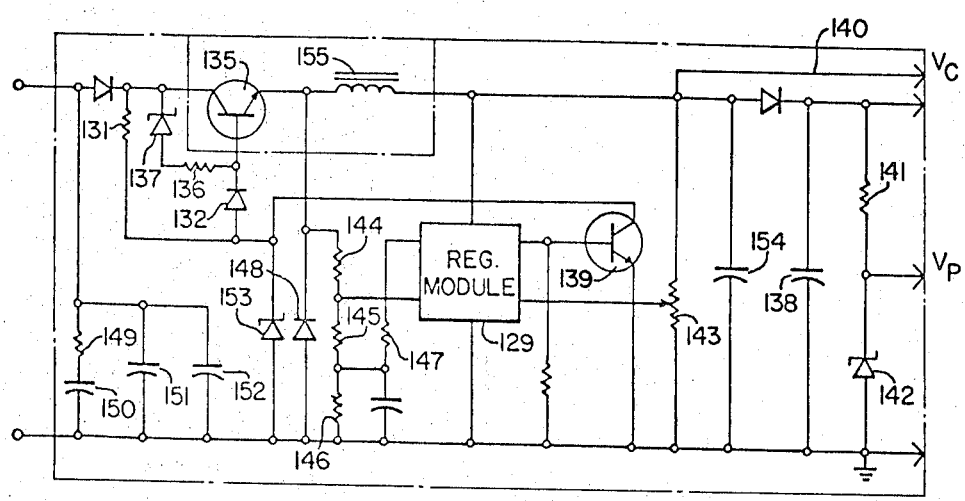
FIG. 4

3,852,732

SOLID STATE UNIVERSAL BATTERY MONITOR

CROSS REFERENCE TO RELATED APPLICATIONS

This is a continuation-in-part of copending application Ser. No. 346,532, filed Mar. 30, 1973, and now abandoned.

BACKGROUND OF THE INVENTION

1. Field of the Invention

This invention relates to voltage monitors and more particularly to methods and apparatus for monitoring terminal voltage of the battery which supplies the power for operating an electric-powered vehicle and disabling an operative function of the vehicle when the battery reaches a predetermined discharge state.

2. Description of the Prior Art

In battery-powered vehicles, for example a fork-lift truck it is desirable to assure that the operator will return the vehicle to the battery charging station so that the battery can be recharged when the battery reaches a predetermined discharge state. Several difficulties are encountered when it is attempted to design a monitor to assure that the vehicle is operated in this manner. For example, batteries in these applications are often subjected to short but rather heavy loads which causes the terminal voltage of the battery to momentarily drop quite significantly. Once the temporary load is removed the battery voltage will begin to recover to normal. However, the recovery rate will depend on the extent of the load, the charge condition of the battery and duration of the load. There are also switching transits which are generated as the controller is turned on and off. These characteristics of typical loads mean that the charge condition of the battery cannot be determined by simply monitoring the terminal voltage of the battery.

The monitor should also be designed such that once the vehicle has been disabled that it cannot be reenabled until the battery voltage exceeds a predetermined value. A particular vehicle manufacturer may also make equipment operating on a variety of battery voltages. This makes it desirable that the monitor be capable of operating with a reasonable variety of battery input voltages.

SUMMARY OF THE INVENTION

The above problems are substantially solved by the disclosed battery monitor. In the disclosed monitor, a circuit is included which requires that the battery voltage exceed a preset level before an operative feature of the vehicle is enabled. The terminal voltage of the battery is continuously monitored by voltage threshold circuits. If the terminal voltage falls below a preset level a first warning indicator is turned on. At the same time that the first warning indicator is turned on, a timing circuit is initiated which monitors the duration of the first warning signal. If the battery voltage recovers to a predetermined level before the period determined by the first timing circuit expires, the first warning is cancelled and normal operation is continued. However, if the battery voltage does not return to a preset level during this period a second warning and a second timer to time the duration of this warning is initiated. If the battery voltage returns to a preset level during the duration of the second warning all timing and warning functions are cancelled and the operation returned to normal. However, if the battery voltage does not return to a preset level during this second period an operative feature of the vehicle is disabled and normal operation can only be restored by installing a charged battery in the fork-lift truck. A circuit is also included which disables the selected operative feature without delay or warning. The voltage levels which initiate the various warning and disable functions are adjustable.

Although the invention is described above with reference to a fork-lift truck it should be obvious that the battery monitor can be utilized by other equipment with depends on electric storage batteries and as a source of energy.

DESCRIPTION OF THE DRAWINGS

FIG. 1 is a functional block diagram of the invention.

FIG. 3 is a schematic diagram of the power supply used by the monitor.

FIG. 4 is a second embodiment of a circuit for discharging the filter capacitor associated with the comparator circuits utilized by the monitor.

DETAILED DESCRIPTION

Figure 2:
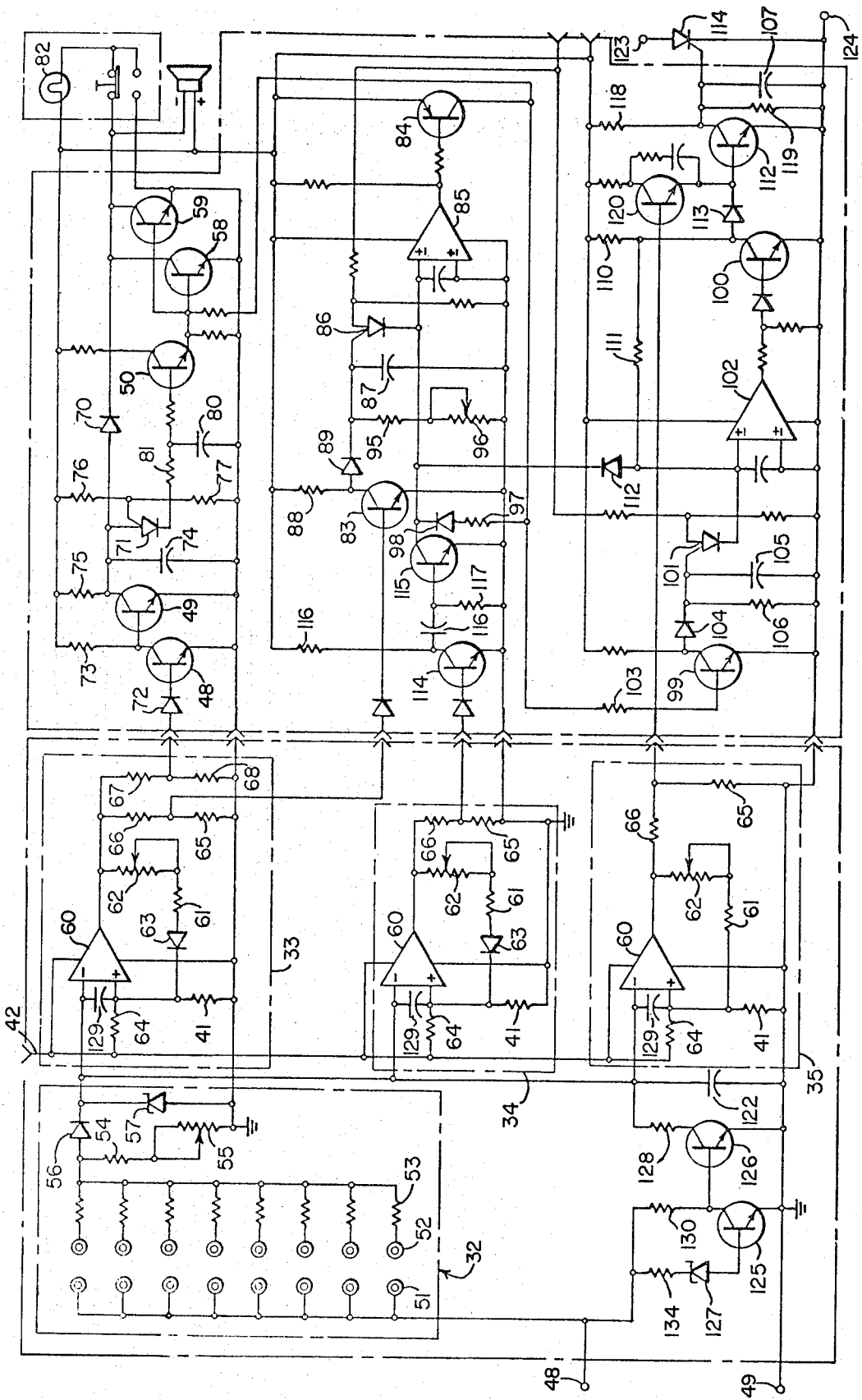
FIG. 2 is a schematic diagram of the warning and disable circuits.

FIG. 1 is a functional block diagram of the monitor. The output voltage of the battery is coupled to an input scaling circuit 32. The output of the scaling circuit 32 is a predetermined fraction of the terminal voltage of the battery and is coupled to the first inputs of first, second, and third comparators, respectively, illustrated at reference numerals 33, 34 and 35. The second input to each of these circuits is a voltage from a precision reference source 40. The comparators would normally include circuits which scale down the precision voltage to generate the different thresholds for the various comparisons. The comparators may also be designed such that they have both high and low thresholds permitting each comparator to generate a signal which is indicative of two specific threshold levels. This permits the comparators 33, 34 and 35, to be used to compare the battery voltage to the five thresholds. These circuits will be discussed in more detail later.

The third comparator 35 generates an output signal which is coupled directly to the disable circuit 46. This circuit causes the selected operative feature of the vehicle to be disabled immediately when the battery voltage falls below the second threshold level and requires that the battery voltage exceed the first threshold level before the operative feature of the vehicle is enabled. The second threshold level is usually set near zero volts so that this control loop does not normally disable the selected operative feature except when the battery voltage goes to zero due to changing of the battery.

The first comparator 33 generates two output signals. One of these signals is coupled to a flashing warning circuit 36. Whenever the battery voltage falls below the third threshold this flashing circuit is energized and generates a first warning signal which is coupled to the indicator 37. When this signal is present a light associated with the indicator 37 will alternately flash "on" and "off".

The first warning signal will be terminated when the first comparator 33 indicates that the battery voltage has increased above the fourth threshold or whenever the continuous warning circuit 39 is activated. The continuous warning circuit 39 will be described subsequently.

A second output signal from the first comparator 33 is coupled to a first timing circuit 38. This circuit is activated substantially simultaneously with the flashing warning circuit 36. This timing circuit generates a signal which specifies a time period during which the battery voltage must rise above the fourth threshold value or a continuous warning circuit 39 will be activated. If the battery voltage does not exceed the fourth threshold value within the time period specified by the first timing circuit 38 the continuous warning circuit 39 is activated, the flashing warning is turned off and a steady warning associated with indicator 37 is activated.

Simultaneously with the initiation of the continuous warning a second timing circuit 45 is initiated by a signal generated by the continuous warning circuit 39. This timing circuit generates a signal which specifies a time period during which the terminal voltage of the battery must rise above the fifth threshold, determined by the second comparator 34, or the selected operative feature of the vehicle will be disabled.

Assuming that the time period specified by the second timing circuit 45 expires and the voltage of the battery has not exceeded this threshold, a signal will be generated which is coupled to the disable circuitry 46 causing this circuitry to disable the selected operative feature of the vehicle. Alternatively, if the voltage of the battery does exceed this threshold within this time period, the second comparator 34 will generate a signal which initiates the reset circuitry 47 causing this circuitry to generate signals which reset the first and second timing circuits, 38 and 45, to restore normal operation.

After the selected operative feature of the vehicle has been disabled because the warning signals have presisted for the specified time period, the battery voltage must rise above the fifth threshold, determined by comparator circuit 34, before the disable circuit 46 will permit the disabled feature to be re-enabled. This threshold is adjustable and may be substantially equal to the maximum terminal voltage of the battery.

FIG. 2 is a schematic diagram of the warning and disable circuits. The plus and minus terminals of the battery are respectively coupled to input terminals 48 and 49. The positive terminal 48 is in turn coupled to input scaling circuit 32. The input scaling circuit 32 comprises first and second groups of temrinals with a typical terminal in each of these groups respectively illustrated at reference numerals 51 and 52. Each terminal of the first group, with a typical example illustrated at reference numeral 51 is connected in parallel and in turn to terminal 48. Each terminal of the second group, with a typical terminal being illustrated at reference numeral 52, is coupled to a resistor. A typical resistor is illustrated at reference numeral 53. The second end of all the resistors are connected in parallel. A diode resitor network is coupled between the common terminal of these resistors and the ground terminal of the circuit. The resitor diode network includes two resistors 54 and 55, connected in series with one of the resistors being variable. A conventional diode and a Zener diode are connected in series and in turn connected in parallel across the two series coupled resistors, 54 and 55.

These diodes are respectively illustrated at reference numerals 56 and 57. The junction of the two diodes forms the output terminal of the input scaling circuit 32. The conventional diode 56 functions to protect the circuit from reverse polarity voltages. The Zener diode 57 limits the output voltage of the input scaling circuit 32 to an amplitude which will not damage the circuit.

Detailed schematic diagrams of the first, second and third comparators are shown in FIG. 2. The first, second and third comparators, 33, 34 and 35, are essentially identical except that the third comparator 35 does not have a diode in the feedback loop. The first comparator 33 will be discussed in detail. The operation of the other comparators should be obvious in view of the discussion of the first comparator 33. Similar components in the various comparators are labeled with the same reference numerals. It is believed that this will aid in understanding the similarities between the comparators.

The first comparator is illustrated at reference numeral 33 in FIG. 2. The basic comparator comprises a differential amplifier 60, a feedback network, a divider network coupled to one input of the differential amplifier 60 and a capacitor 129. The feedback network comprises a fixed resistor 61 in series with a variable resistor 62 and a diode 63. The divider network comprises two resistors, 64 and 41. This resistor divider network is coupled between a reference voltage input terminal 42 and the ground terminal of the comparator 33. The junction formed by series connecting these resistors, 64 and 41, is coupled to the positive (noninverting) input terminal of the differential amplifier 60 and the feedback network is coupled between the output of the amplifier 60 and the positive input terminal of this amplifier. The gain of the differential amplifier 60 is sufficiently high so that the output signal of this amplifier is essentially a two-level signal depending on the relative amplitude of the voltage appearing at the input terminals of this amplifier. The positive and negative threshold voltages of the comparator 33 are also independently adjustable. For example, the positive threshold is basically determined by the value of the resistors, 61 and 62, in the feedback network. thus, the positive threshold can be adjsuted by varying the variable resistor 62. This separation of the threshold adjustments is possible because when the output signal or amplifier 60 is negative, the diode 63 in the feedback loop is reverse biased. This reduces the feedback to zero making the negative threshold a function of the input divider comprising resistors 64 and 41. By suitably selecting the components of the feedback and divider networks, the negative and positive thresholds of this comparator can be indepentently adjusted over a wide range.

It is desirable to have two outputs form the comparator 33 with the output signals having a reasonable degree of isolation between each other. This is accomplished by connecting two series resistor-divider networks across the output of the amplifier 60 and using the output of these dividers as the two output signals of the comparator 33. The resistors comprising these dividers are shown at reference numerals 65, through 68.

The second comparator 34 is essentially identical with the first comparator 33 except that only one output signal is desired and therefore, one of the resistor divider-networks coupled across the output of the amplifier has been deleted. The third comparator 35 is also similar to the first comparator 33 except that the diode in the feedback network has been eliminated. Because of the above discussed similarities of the various threshold circuits, it is believed to be unnecessary to discuss the detail operation of the second and third comparators, 34 and 35.

The first comparator circuit 33 compares the battery voltage to the third and fourth thresholds. The second comparator 34 compares the battery voltage to the fifth threshold. The third comparator 35 compares the battery voltage to the first and second thresholds.

The first output of the first comparator 33 is coupled to the input of a circuit which drives the flashing warning indicator. This circuit includes transistors 48, 49, 50, 58 and 59, a diode 70 and a unijunction transistor 71.

The first comparator 33 is normally adjusted such that when the battery voltage of the vehicle is within normal operating range the output signal of the first comparator 33 is low. This output signal is coupled to the input transistor 48 of the flashing circuit through a diode 72. The low value of this signal causes transistor 48 to be turned off. Turning off the first transistor 48 causes the second transistor 49 to be biased into the highly conductive region by base current which flows through the collector resistor 73 of the first transistor 48. This highly conducting transistor essentially forms a short circuit across a capacitor 74.

Capacitor 74 is the timing capacitor of the circuit which enerates the on and off signal to operate the flashing warning indicator. Holding this capacitor 74 in a discharge state disables the flashing circuit holding the flashing warning in the off condition.

When the battery voltage falls below the third threshold voltage, the output signal of the first comparator 33 goes high turning the first transistor 48 on and the second transistor 49 off. When the second transistor 49 is turned off the timing capacitor 74 begins to charge through the collector resistor 75 of the second transistor 94. The unijunction transistor 71 triggers when the timing capacitor 74 accumulates sufficient charge to cause the voltage drop across the timing capacitor 74 to rise to the trigger point of the unijunction 71. The trigger level of this unijunction transistor 71 is determined by a resistor bias network comprising two resistors 76 and 77. When the unijunction transistor 71 triggers, a second capacitor 80 is charged through a resistor 81. When the second capacitor 80 has accumulated sufficient charge transistor 50 will begin conducting turning on two parallel connected transistors 58 and 59. When these transistors turn on the first timing capacitor 74 will be discharged rather rapidly through a feedback diode 70. This causes the unijunction transistor 71 to turn off. However, the two parallel connected transistors 58 and 59 which are coupled to the flashing light indicator 82 will not be turned off immediately because sufficient charge has accumulated on the second capacitor 80 to hold these transistors on for a brief period of time. This causes the circuit to begin to oscillate alternately turning on and off a flashing light 82 to generate the previously described flashing warning signal. This warning will continue until it is either terminated by the battery voltage coupled to the first comparator 33 rising above the fourth threshold or by the beginning of the steady warning signal.

A second output from the first comparator 33 is coupled to the first timing circuit 38. This circuit is triggered substantially conincident in time with the beginning of the flashing warning signal. At the end of a time period specified by this circuit the flashing warning will be terminated and a steady warning will be initiated provided the battery voltage has not increased above the fourth threshold level.

The first timing circuit comprises two transistors, an operational amplifier, a unijunction transistor and associated resistor and capacitors. The transistors are illustrated at reference numerals 83 and 84. The operational amplifier and interjunction are respectively illustrated at reference numerals 85 and 86.

When the terminal voltage of the battery being monitored exceeds the third threshold level the output signal from the first capacitor 33 is such that the input transistor 83 of the first timing circuit is biased off. This causes the timing capacitor 87 to be charged through the collector resistor 88 and isolation diode 89. The voltage across the timing capacitor 87 is such that the unijunction transistor 86 will be turned off causing the output of the differential amplifier 85 to go high thereby turning off the output transistor 84. When the battery voltage falls below the third threshold, the output of the first comparator 33 will go high and turn on the input transistor 83. This causes the collector terminal of this transistor 83 to go low thereby reducing the charging current, which normally flows through the collector resistor 88 of the first transistor into the timing capacitor 87, to zero. Discharge of the timing capacitor 87 through the input transistor 83 is prevented by an isolation diode 89 which becomes reversed biased when the input transistor 83 becomes highly conductive. After the isolation diode 89 becomes reversed biased, the timing capacitor 87 begins to discharge through two series connected ristors 95 and 96. When the voltage across the timing capacitor 87 falls below the trigger point of the unijunction transistor 86, this unijunction triggers causing the output of amplifier 85 to go low. The low output voltage of this amplifier turns on the output transistor 84. The collector of the output transistor 84 is also coupled to the base of the parallel connected transistors 58 and 59. When the output transistor 84 becomes highly conductive, transistors 58 and 59 are turned on causing the warning light 82 to operate continuously to generate the continuous warning signal. The collector of the output transistor 84 is also coupled through a resistor and a diode, 97 and 98, to the input of the amplifier 85. This is a positive feedback loop which causes the output signal of this amplifier to remian low until the circuit is reset. The continuous warning signal will remain on until the battery voltage rises above the fifth threshold determined by comparator 34.

The output signal of the first timing circuit 38 is also coupled to the input of a second timing circuit such that the second timing circuit is initiated when the steady warning indication is turned on. This second timing circuit comprises an input transistor 99, an output transistor 100, a unijunction transistor 101 and an amplifier 102. When the steady warning indicator is turned on, as previously described above, the collector of transistor 84 goes positive. This positive voltage is coupled to the base of the input transistor 99 of the second timing circuit 45 through an input resistor 103. This causes the input transistor 99 to become highly conductive causing the collector terminal of this transistor to be approximately zero volts with respect to ground. This reverse biases isolation diodes 104 and permits the timing capacitor 105 to begin discharging through the timing resistor 106. When the voltage across timing capacitor 105 falls below the trigger point of unijunction transistor 101, this unijunction triggers thereby providing a signal to the input of an amplifier 102. This signal causes the output signal of this amplifier to go low causing the output transistor 100 to turn off. Postive feedback to the input terminal of amplifier 102 from the collector of the output transistor 100 is provided by the collector and feed-back resistors 110 and 111. This feedback causes this circuit to function as a memory. A reset signal is also coupled to the first timing circuit by an isolation diode 112.

When the output transistor 100 of the second timing circuit turns off, indicating that the time period specified by this circuit has expired, an SCR drive transistor 112, coupled to the collector of this transistor 100 through a diode 113, becomes highly conductive depriving the SCR 114 of its gate drive current. This turns off the SCR 114 and disables the selected operative feature of the vehicle because the SCR is in series with the load by means of two terminals, 123 and 124. Operation can only be restored when the battery voltage rises above the fifth threshold.

The above disable sequence may be interrupted by a reset signal which resets both the warning and timing circuits if the battery voltage rises above the fifth threshold before the expiration of the time period specified by the second timing circuit. This reset signal is initiated by the output signal of a second comparator circuit 34. This comparator circuit is essentially identical with the first comparator except that only one resistor-divider network is coupled across the output because only one output signal is derived from this comparator. Therefore, the details of how this comparator operates will not be discussed as they are believed to be obvious in view of the previous detailed discussion of the first comparator 33.

The output signal of the second comparator 34 is coupled to a reset circuit comprising two transistors 114 and 115. The lower threshold level of the second comparator 34 is set to be practically the same as the lower threshold level of the first comparator 33. Therefore, when the first timing circuit is initiated the output signal of the second comparator 34 will go high causing the input transistor 114 of the reset circuit to become conductive causing the collector voltage of this transistor to drop to a low value due to the voltage drop across its collector resistor 116. If the battery voltage rises above the fourth threshold, indicating that the timing and warning circuits should be reset to inhibit a disable signal from being generated, the output signal of the second comparator 34 will go negative causing the input transistor 114 to turn off. Turning off this transistor causes a positive going signal to be coupled to the base of the second transistor 115 of this circuit through coupling capacitor 116 and bias resistor 117. This causes transistor 115 to turn on and generates a reset signal which is coupled to the input of amplifiers 85 and 102 causing the first and second timing circuits to be reset thereby restoring normal operation.

It is necessary to filter the input to the monitor so that variations in the output voltage of the battery which are not related to the charge condition of the battery will be eliminated. This filtering is performed by a capacitor 122 which is connected in parallel with the output terminal of the input scaling circuit 32.

In order to assure that the monitor cannot be made to operate improperly by alternately connecting and disconnecting the monitor, it is necessary that the filter capacitor 122 be discharged each time the monitor is disconnected from the battery. This discharge function is performed by a circuit comprising transistors 125 and 126 and Zener diode 127.

Whenever the monitor is coupled to a battery voltage, transistor 126 will come on first and discharge the filter capacitor 122 through resistor 128. When the voltage rises sufficiently high for the Zener diode 127 to break down, transistor 125 will begin to conduct. A resistor 130 connected in series with the Zener diode 127 limits the current through this diode to a safe value. When the first transistor 125 begins conducting the base voltage of the second transistor 126 will be reduced to a level sufficient to cut this transistor off due to the voltage drop across resistor 134. After transistor 126 cuts off the filter capacitor 122 will charge up to a level determined by the battery voltage and normal operation of the monitor will begin. Susceptibility to transists is farther reduced by a filter capacitor 129 across the input temrinal of the amplifier 60 comprising the comparator circuits. Similar filters are used in amplifier 85 of the first timing circuit and amplifier 102 of the second timing circuit.

In the embodiment described in FIG. 2, the input transistor 125 of the circuit which discharges the filter capacitor 122 receives its collector voltage directly from the terminals of the battery being monitored. An alternate arrangement for this circuit is illustrated in FIG. 3. In this embodiment, the junction formed by the common connection of the current limiting resistor 134 and the collector resistor 130 are connected to a separate terminal 131. This terminal is then coupled to the precision voltage supply which supplies the reference voltage to the comparator circuits. This arrangement isolates the discharge circuit from variation in the terminal voltage of the battery.

The circuitry illustrated in FIG. 2 and discussed above is supplied with DC operating voltages from a power supply illustrated in FIG. 5. The illustrated power supply utilizes an ingegrated circuit switching mode regulator 129. This regulator may be a commercially avialable Model 723 manufactured by Texas Instruments. The output of the switching regulator module 129 is coupled to an amplifier transistor 139. The collected of the transistor 139 is coupled to a pass regulator transistor 135 by a resistor 131 and a diode 132. The base to collector junction of transistor 135 is bypassed by the series combination of a resistor 136 and a Zener diode 137. This bypass of the base to collector junction of this transistor 135 prevents it from being damaged by high voltage switching transists which may be present on the battery terminal voltage.

The emitter of the regulator transistor 135 is coupled to an inductor 155. This inductor 155, in conjunction with filter capacitors 138 and 154, remove substantially all of the AC components of the output current from the regulator transistor 135. The collector supply voltage for the circuits illustrated in FIG. 3 is available on buss terminal 140. The precision supply voltage for the comparators and the delay circuits illustrated in FIG. 3 is obtained by dividing down the collector supply voltage by a series circuit comprising a resistor 141 and a Zener voltage 142.

The output voltage of the power supply is determined by an adjustable resistor 143. Bias voltages are supplied to the regulator module 129 by a network comprising resistors 144 through 148 while the Zener diode 148 limits the bias voltage to a safe value. Another Zener diode 153 is coupled between the collector and emitter terminals of the transistor 139 to assure that high voltage transits which may be superimposed on the battery voltage will not exceed the base to emitter rating of this transistor. Transits on the battery voltage are further reduced by a filter network comprising resistor 149 and capacitors 150 through 152.

We claim:

1. Apparatus for monitoring the output voltage of a battery used as an energy source for electrically powered equipment and for disabling a selected function of said equipment when the output voltage of said battery remains within preselected regions for a preselected time, comprising in combination:
   a. first means for generating a first warning signal when the output voltage of said battery is below a first preselected value and for terminating said first warning signal when said battery voltage exceeds a second preselected value;
   b. second means for terminating said first warning signal and initiating a second warning signal whenever said first warning signal has persisted for a period exceeding a first preset time period;
   c. third means for terminating said second warning signal if the terminal voltage of said battery rises to a third preselected value within a second preselected time period; and
   d. disable means for diabling a function of said electrically powered equipment if the terminal voltage of said battery does not rise to said second preselected value within said second preselected time period.

2. Apparatus for monitoring the output voltage of a battery in accordance with claim 1 wherein said first means includes range selection circuitry for scaling the terminal voltage of said battery to permit the monitoring range of said apparatus to be selected without modifying said apparatus.

3. Apparatus for monitoring the output voltage of a battery in accordance with claim 2 wherein said range selection circuitry includes means to protect said apparatus from reverse polarity input voltages.

4. Apparatus for monitoring the output voltage of a battery in accordance with claim 3 wherein said range selection circuitry includes means for protecting said monitor from voltages in excess of the normal expected operating range.

5. Apparatus for monitoring the output voltage of a battery in accordance with claim 1 wherein said first means includes a threshold circuit for generating a signal which initiates said first warning when the battery voltage falls below a first threshold and terminates said first warning when the battery voltage exceeds a second threshold.

6. Apparatus for monitoring the output voltage of a battery in accordance with claim 1 further including means for enabling said function of said equipment when the terminal voltage of said battery exceeds a preselected value.

7. A method for monitoring the output voltage of a battery used as an energy source for an electrically powered vehicle and for selectively controlling an operative feature of said vehicle, comprising the steps of:

a. monitoring the terminal voltage of said battery and enabling said operative feature when the terminal voltage of said battery exceeds a first preselected value;
   b. monitoring the terminal voltage of said battery and initiating a first warning signal when the terminal voltage of said battery falls below a second preselected value;
   c. terminating said first warning signal and initiating a second warning signal if the output voltage of said battery remains below a third preselected value for a first selected time period;
   d. disabling an operative feature of said vehicle if the terminal voltage of said battery does not rise above a third preselected value within a second preselected time period.

8. The method for monitoring the output voltage of a battery in accordance with claim 7 wherein said first, second, third and fourth preselected values are independently selected.

* * * * *